United States Patent [19]

Movick

[11] Patent Number: 4,860,578

[45] Date of Patent: Aug. 29, 1989

[54] METHOD AND APPARATUS FOR DETERMINING THE CENTER OF GRAVITY OF A SPHERICAL BALL

[76] Inventor: Nyle O. Movick, 4600 Macky Way, Boulder, Colo. 80303

[21] Appl. No.: 94,495

[22] Filed: Sep. 9, 1987

[51] Int. Cl.$^4$ .............................................. G01M 1/12
[52] U.S. Cl. ....................................................... 73/65
[58] Field of Search ..................... 73/65, 66, 483, 570; 366/113, 127

[56] References Cited

U.S. PATENT DOCUMENTS

| | | | |
|---|---|---|---|
| 3,136,151 | 6/1964 | Arneson | 73/483 X |
| 4,111,038 | 9/1978 | Olson et al. | 73/65 |
| 4,691,725 | 9/1987 | Parisi | 366/127 X |

Primary Examiner—Jerry W. Myracle

[57] ABSTRACT

This invention is a method for determining an axis of an unbalanced spherical ball which axis contains its geometric center as well as its center of gravity. This axis is determined by using semi-floating means in which a spherical ball is placed into a spherical cup and the ball and the cup are immersed in a liquid in which the ball does not float.

If, by suitable means, the liquid is made to vibrate at a certain frequency rate and at a certain power level, the ball will be made to float even though total flotation effort is not present. Continuing the ball at these conditions for a suitable period of time, the heavy portion of the ball will rotate by gravity to the bottom-most position and the desired axis is thereby vertical and thereby determined.

8 Claims, 3 Drawing Sheets

METHOD AND APPARATUS FOR DETERMINING THE CENTER OF GRAVITY OF A SPHERICAL BALL

BACKGROUND AND SUMMARY OF THE INVENTION

The present invention relates to a semi-floating method and apparatus for testing and determining an axis of a sperical ball which axis includes its geometric center and its center of gravity.

The phenomenon of the weight center not being located exactly at the geometric center of a spherical ball is widely known. Various studies of this unbalanced condition have been made. In the case of a golf ball, this phenomenon is described in detail by Olson et al in U.S. Pat. No. 4,111,038. Their findings showed this unbalanced condition to cause a golf ball to possibly veer undesirably when being putted. Further recited in their invention is a method and apparatus for testing and locating an axis in an unbalanced golf ball containing both its geometric center as well as its center of gravity and a method for indelibly marking the uppermost point of this axis. Their findings allowed for a certain control over this undesirable veering when a tested and marked golf ball was being putted.

Their method for locating this axis involved floating the golf ball in a mixture of water and magnesuim sulfate. The magnesium sulfate increased the density of the mixture sufficiently to cause the golf ball to float.

Present invention does not utilize densifying agents to cause a ball to float but rather uses liquid vibration means for forcing a thin layer of liquid between the ball and its supporting surfaces thus causing the ball to be suspended from its supporting surfaces by this layer of liquid and, hence, the ball appears to float even though it may be completely submerged in the chosen liquid.

In the case of golf balls, persons skilled in the game of golf recognize the importance of this "out of balance" condition of golf balls and would be inclined to use this information were it readily available at reasonable cost.

In one embodiment of the invention, a cup is carefully manufactured such that its inner spherical diameter is slightly larger than the outer spherical diameter of the ball to be tested. Further, some of the ball supporting surfaces of the cup are removed such that a carefully controlled ratio exists between these remaining ball supporting surfaces and the surface area of the ball to be tested.

When a cup as described above containing a common golf ball to be tested is immersed in ordinary water, the ball does not float. If the water is then made to vibrate at a certain frequency rate and at a certain power level, the golf ball will appear to float in that it is forced from its supporting surfaces by a relatively thin layer of the vibrating water. Once forced from its supporting surfaces, the golf ball is caused to rotate by gravity until its heavy portion is at the lowermost position and, hence, the desired axis containing the center of gravity and geometric center will become vertical and thereby determined.

Common golf balls may be tested in this manner using ordinary tap water without the use of or need for densifying agents. Further, common golf balls may be tested at relatively high rates of speed and hence, low cost in this manner also.

Hence, it can be seen that any number of combinations of properly made spherical cups, spherical balls and liquids may be chosen and the balls to be tested made to appear to float in the chosen liquid by this liquid vibration means without the need for or use of densifying agents or the like.

Some spherical balls with differing specific gravities may require the use of liquids of higher specific gravities than water such as FREON 11 or FREON 113. Additionally, spherical ball and liquid combinations wherein the spherical ball has specific gravity ranges of approximately 1.1 to 7.9 and the liquid has specific gravity ranges of approximately 0.8 to 14.0 may be used.

DETAILED DESCRIPTION OF THE INVENTION

Figure 2:
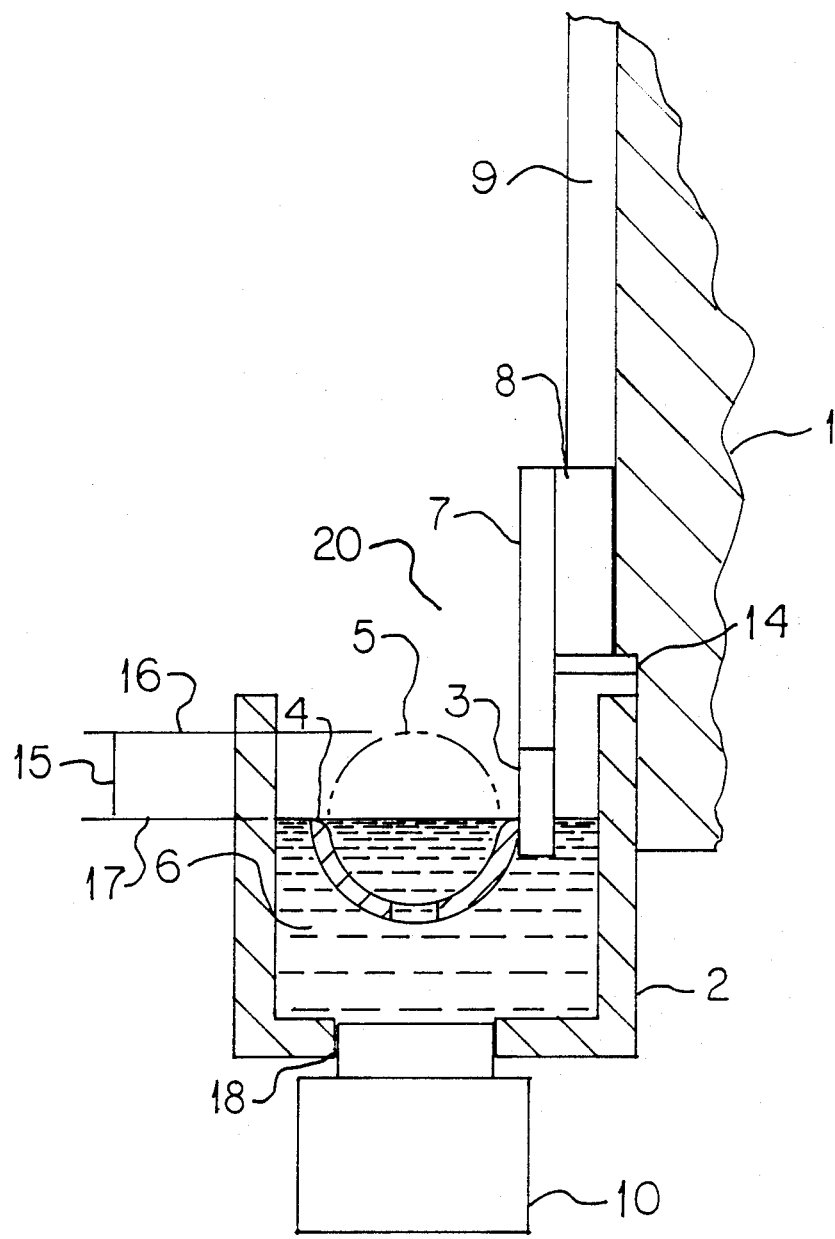
FIG. 2 is a sectional view of a semi-floating method and apparatus for determining the axis of an unbalanced spherical ball.

A cross sectional view of a new and improved method and apparatus for determining an axis of an unbalanced spherical ball is shown in FIG. 2. Method and apparatus generally comprising the following: Numeral 5 is any unbalanced spherical ball placed in close fitting spherical cup 4. Cup 4 is rigidly affixed to cross bar 3. Vertical riser 7 is rigidly affixed at the center point of cross bar 3. Affixed at the top of verticle riser 7 is guide wedge 8. Guide wedge 8 is closely but freely fitted into guide slot 9 formed in supporting structure 1. Hence, it can be seen that cup 4, cross bar 3, vertical riser 7, and guide wedge 8 form a rigid, non-seperable assembly 20 which can be raised and lowered in guide slot 9 by any convenient means. Lower stop 14 provides for positioning this non-seperable assembly 20 at its lower-most point.

Container 2 is any substantial vessel for containing predetermined liquid 6. Container 2 is rigidly affixed to support structure 1. Liquid vibration unit 10 is suitably mounted to container 2 through hole 18 in such a manner that vibrating portions are in contact with liquid 6. The level of liquid 6 can readily be adjusted through adjustment range 15 by adding or removing liquid 6 as required. Line 16 may represent the uppermost level of liquid 6 while line 17 may represent the lowermost level of liquid 6.

Figure 3:
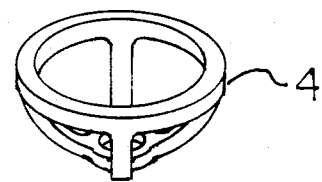
FIG. 3 is a perspective view of a preferred embodiment cup.

Spherical cup 4 is a substantially made cup whose inner spherical diameter is slightly larger than outer spherical diameter of said ball 5. As shown in FIG. 3, said cup 4 has materials removed such that cup rigidity remains while providing for optimum liquid contact with said ball 5.

Figure 5:
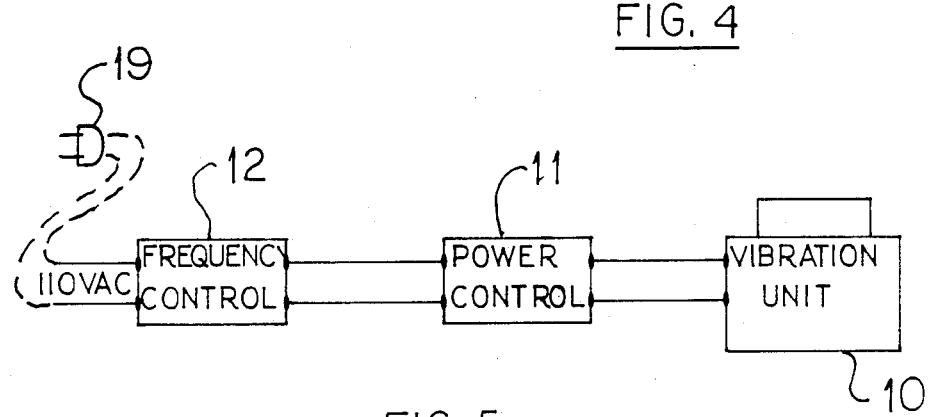
FIG. 5 is a schematic diagram of the controls method for the liquid vibrating unit.

Liquid vibration unit 10 is a commercially available electrical unit designed specifically for vibrating a liquid. Hole 18 is provided in container 2 such that those portions of liquid vibration unit 10 normally in contact with the liquid to be vibrated, extend through hole 18 and are in proper and substantial contact with liquid 6. FIG. 5 is a schematic diagram of the liquid vibration unit controls consisting of:

Power control unit 11 may be any number of commercially available units especially designed to control the overall power level to an electrical device.

Frequency control unit 12 may be any number of commercially available units especially designed to control the frequency rate of an electrical signal.

Operation

Cup 2 is filled with predetermined liquid 6 to optimum liquid level range 15. Liquid vibration unit 10 is then energized by connecting plug 19 to any appropriate power source. Non-separable assembly 20 is raised to any appropriate height by any convenient means such that the appropriate spherical ball 5 to be tested may be readily placed in cup 4. Non-separable assembly 20 is then lowered by any convenient means to lower stop position 14 such that cup 4 containing spherical ball 5 are immersed to desired level in predetermind liquid 6. In a relatively short period of time, spherical ball 5 will rotate by gravity until its heavy portion is at the bottom-most position. Non-seperable assembly 20 is then raised by any convenient means such that said upper-most axis of spherical ball 5 may be marked using any suitable marking means.

Persons skilled in such areas will recognize that an optimum frequency of vibration rate, an optimum power level and an optimum depth of immersion may be determined such that spherical ball 5 will rotate such that its heavy portion is at the bottom-most position in the desired least amount of time.

PREFERRED EMBODIMENT

Figure 1:
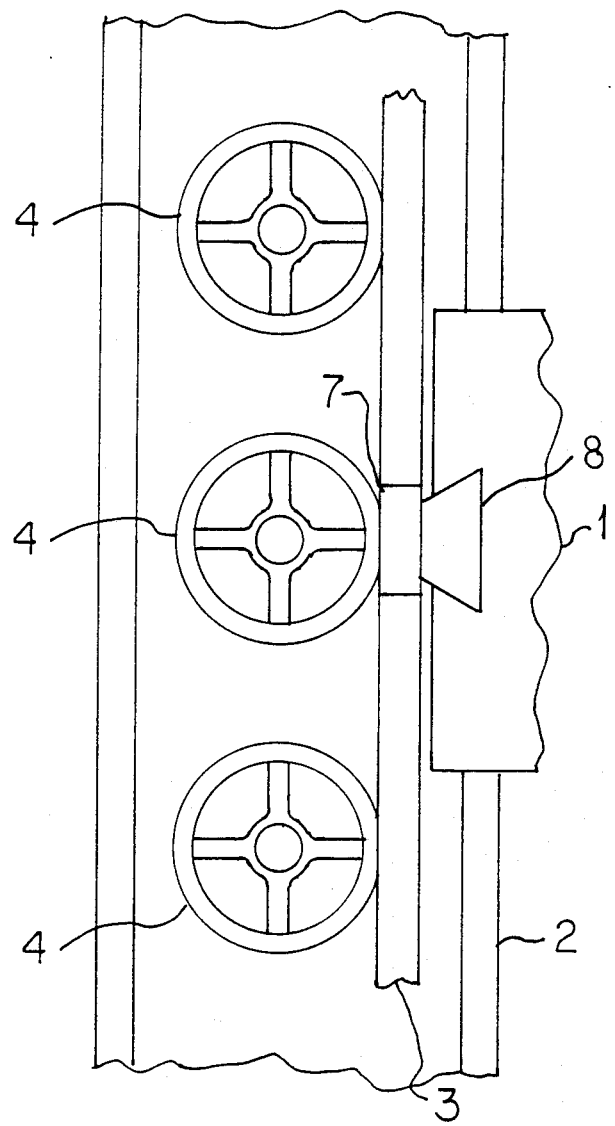
FIG. 1 is a plan view of the preferred embodiment of a semi-floating method and apparatus for determining the axis of an unbalanced spherical ball.

FIG. 1 is a plan view of the preferred embodiment. Persons skilled in the art will recognize that any convenient number of cups 4 may be rigidly affixed to support bar 3. Three cups 4 rigidly affixed to support bar 3 are shown as the preferred embodiment.

Figure 4:
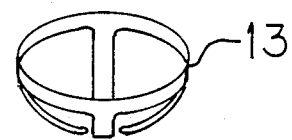
FIG. 4 is a perspective view of a thin wall cup.

As shown in FIG. 3, cup 4 is a comparatively rigid spherical device slightly larger than the ball being tested. For balls whose surfaces are relatively smooth, cup 4 is the preferred embodiment. Balls whose surfaces are comparatively rough may require cup 13 as shown in FIG. 4. Cup 13 is a relatively thin walled device whose wall thickness is such that the supporting tangs will tend to vibrate at the same frequency rate as the liquid but will support the weight of the ball being tested. This has the result of providing a slightly thicker layer of liquid between the ball being tested and the supporting surfaces. Hence, balls with comparatively rougher surface may be tested.

Although the present invention has been described in terms of a particular embodiment, providing for locating an axis of an unbalanced spherical ball which axis includes its geometric center and its center of gravity employing a semi-floating means, the system could also be used in other semi-floating applications and it is anticipated that various changes, adaptations and modifications will be apparent to those skilled in the art, and it is intended that the appended claims be construed to cover such changes, adaptations, and modifications except as limited by the prior art.

What is claimed is:

1. A method of determining the axis of an unbalanced spherical ball comprising:
   immersing said ball in a liquid in which said ball does not float,
   supporting said ball by spherical support means slightly larger than said ball,
   vibrating said liquid at such a power level and frequency that apparent flotation is produced and the unbalanced axis of the ball is oriented vertically due to gravity.

2. The method of claim 1 further including the step of raising said oriented ball from said liquid and applying a balance indicating mark thereto.

3. The method of claim 1 wherein said ball is a golf ball and said liquid is water.

4. The method of claim 1 wherein said ball is a golf ball and said liquid is FREON 113.

5. The method of claim 1 wherein said ball is a golf ball and said liquid is FREON 11.

6. The method of claim 1 wherein said ball has a specific gravity of about 1.1 to 7.9 and said liquid has a specific gravity of about 0.8 to 14.0.

7. An apparatus for determining the axis of an unbalanced spherical ball comprising:
   liquid container means, spherical support means carried by said container means and having a supporting surface diameter slightly larger than said ball.

8. The apparatus of claim 7 further involving means for moving said support means with respect to said container means.

* * * * *